(12) United States Patent
Lee et al.

(10) Patent No.: US 10,816,567 B2
(45) Date of Patent: Oct. 27, 2020

(54) METHOD, APPARATUS, AND COMPUTER PROGRAM FOR ESTIMATING SPEED OF VEHICLE PASSING OVER HORIZONTALLY GROOVED ROAD BY USING ACOUSTIC ANALYSIS

(71) Applicant: Republic of Korea (National Forensic Service Director Ministry of Public Administration and Security), Seoul (KR)

(72) Inventors: Jae Hyeong Lee, Chilgok-gun (KR); Young Nae Lee, Nam-gu (KR); Nam Kyu Park, Bucheon-si (KR); Jong Chan Park, Gimpo-si (KR); Jong Jin Park, Wonju-si (KR)

(73) Assignee: Republic of Korea (National Forensic Service Director Ministry of Public Administration and Security), Seoul (KR)

( * ) Notice: Subject to any disclaimer, the term of this patent is extended or adjusted under 35 U.S.C. 154(b) by 245 days.

(21) Appl. No.: 16/110,949

(22) Filed: Aug. 23, 2018

(65) Prior Publication Data

US 2019/0137533 A1 May 9, 2019

(30) Foreign Application Priority Data

Nov. 6, 2017 (KR) .................. 10-2017-0146788

(51) Int. Cl.
*G01P 3/02* (2006.01)
*G01P 3/48* (2006.01)

(52) U.S. Cl.
CPC . *G01P 3/02* (2013.01); *G01P 3/48* (2013.01)

(58) Field of Classification Search
CPC ..................................... G01P 3/48; G01P 3/02
(Continued)

(56) References Cited

U.S. PATENT DOCUMENTS

| 9,733,346 B1 | 8/2017 | Jang et al. | |
|---|---|---|---|
| 2016/0078760 A1* | 3/2016 | Crickmore | ............. G08G 1/015 701/117 |

FOREIGN PATENT DOCUMENTS

| EP | 0708343 B1 | 5/2000 |
|---|---|---|
| JP | 11142509 A | 5/1999 |

(Continued)

OTHER PUBLICATIONS

Cevher,Vehicle speed Estimation Using Acoustic wave patterns, Jan. 2009 (Year: 2009).*

(Continued)

*Primary Examiner* — Sujoy K Kundu
*Assistant Examiner* — Aeysha N Sultana
(74) *Attorney, Agent, or Firm* — Schwegman Lundberg & Woessner, P.A.

(57) ABSTRACT

Provided is a method of estimating a speed of a vehicle includes obtaining time domain acoustic data from an acoustic storage apparatus when the vehicle passes over a horizontally grooved road; calculating frequency domain acoustic data from the time domain acoustic data by using Fourier transformation; calculating, from the frequency domain acoustic data, a resonance frequency of sound generated between tires of the vehicle and horizontal groovings in the road; and estimating the speed when the vehicle passes over the horizontally grooved road by multiplying the resonance frequency by an interval of the horizontal groovings.

7 Claims, 8 Drawing Sheets

(58) Field of Classification Search
USPC .......................................................... 702/142
See application file for complete search history.

(56) References Cited

FOREIGN PATENT DOCUMENTS

| KR | 100195576 B1 | 6/1999 |
| KR | 1020090086810 A | 8/2009 |
| KR | 1020130061327 A | 6/2013 |
| KR | 101759144 B1 | 7/2017 |

OTHER PUBLICATIONS

Zambon et al ("Scaling model for a speed-dependent vehicle noise spectrum", May 2017) (Year: 2017).*
Korean Application Serial No. 10-2017-0146788, Office Action and Search Report dated Apr. 16, 2018, w/o English Translation, 3 pgs.

* cited by examiner

METHOD, APPARATUS, AND COMPUTER PROGRAM FOR ESTIMATING SPEED OF VEHICLE PASSING OVER HORIZONTALLY GROOVED ROAD BY USING ACOUSTIC ANALYSIS

CROSS-REFERENCE TO RELATED APPLICATION

This application claims the benefit of Korean Patent Application No. 10-2017-0146788, filed on Nov. 6, 2017, in the Korean Intellectual Property Office, the disclosure of which is incorporated herein in its entirety by reference.

BACKGROUND

1. Field

One or more embodiments relate to a method, apparatus, and computer program for estimating a speed of a vehicle by using acoustic analysis.

2. Description of the Related Art

Vehicles are widely used for transport in modern life, and distribution of vehicles has spread to an extent that almost every household has a vehicle. There may be various events that a vehicle may experience, and it is important to find out an exact cause of an event because problems frequently occur when parties of an event make different claims about the cause of the event. In particular, an instantaneous velocity at the moment of a car event is an important factor in analyzing the cause of the event.

At this time, when a black box is provided in a vehicle, a speed of the vehicle may be estimated by analyzing length information of a lane or the like and time information displayed on an image of the black box. However, in a case where there is no object that may be a reference of a length or a distance in the image of the black box, the speed of the vehicle may not be accurately estimated. On the other hand, although the speed may be measured using position information of a global positioning system (GPS) mounted on the black box or a navigation system, since the position information of the GPS has a large error, the reliability of a vehicle speed measurement result may not be guaranteed.

SUMMARY

One or more embodiments include an apparatus, a method, and a computer program for estimating a speed of a vehicle by analyzing a unique sound generated when the vehicle passes over a horizontally grooved road.

Additional aspects will be set forth in part in the description which follows and, in part, will be apparent from the description, or may be learned by practice of the presented embodiments.

According to one or more embodiments, a method of estimating a speed of a vehicle includes obtaining time domain acoustic data from an acoustic storage apparatus when the vehicle passes over a horizontally grooved road; calculating frequency domain acoustic data from the time domain acoustic data by using Fourier transformation; calculating, from the frequency domain acoustic data, a resonance frequency of sound generated between tires of the vehicle and horizontal groovings in the road; and estimating the speed when the vehicle passes over the horizontally grooved road by multiplying the resonance frequency by an interval of the horizontal groovings.

The obtaining of the time domain acoustic data may include: calculating a spectrogram including time-frequency-amplitude information by performing short-time Fourier transformation (STFT) on the time domain acoustic data.

The calculating of the frequency domain acoustic data may include: calculating a resonance frequency function with respect to time through the spectrogram, and the estimating of the speed may include: calculating a speed function with respect to time by multiplying the resonance frequency function by the interval of the horizontal groovings.

According to one or more embodiments, an apparatus for estimating a speed of a vehicle includes a data obtaining unit configured to obtain time domain acoustic data from an acoustic storage apparatus when the vehicle passes over a horizontally grooved road; a conversion unit configured to calculate frequency domain acoustic data from the time domain acoustic data by using Fourier transformation; a resonance frequency calculation unit configured to calculate, from the frequency domain acoustic data, a resonance frequency of sound generated between tires of the vehicle and horizontal groovings in the road; and a speed estimation unit configured to estimate the speed when the vehicle passes over the horizontally grooved road by multiplying the resonance frequency by an interval of the horizontal groovings.

The conversion unit may be configured to calculate a spectrogram including time-frequency-amplitude information by performing short-time Fourier transformation (STFT) on the time domain acoustic data.

The resonance frequency calculation unit may be further configured to calculate a resonance frequency function with respect to time through the spectrogram, and the speed estimation unit may be further configured to calculate a speed function with respect to time by multiplying the resonance frequency function by the interval of the horizontal groovings.

According to one or more embodiments, a non-transitory computer-readable recording medium having recorded thereon a program for performing the method is provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
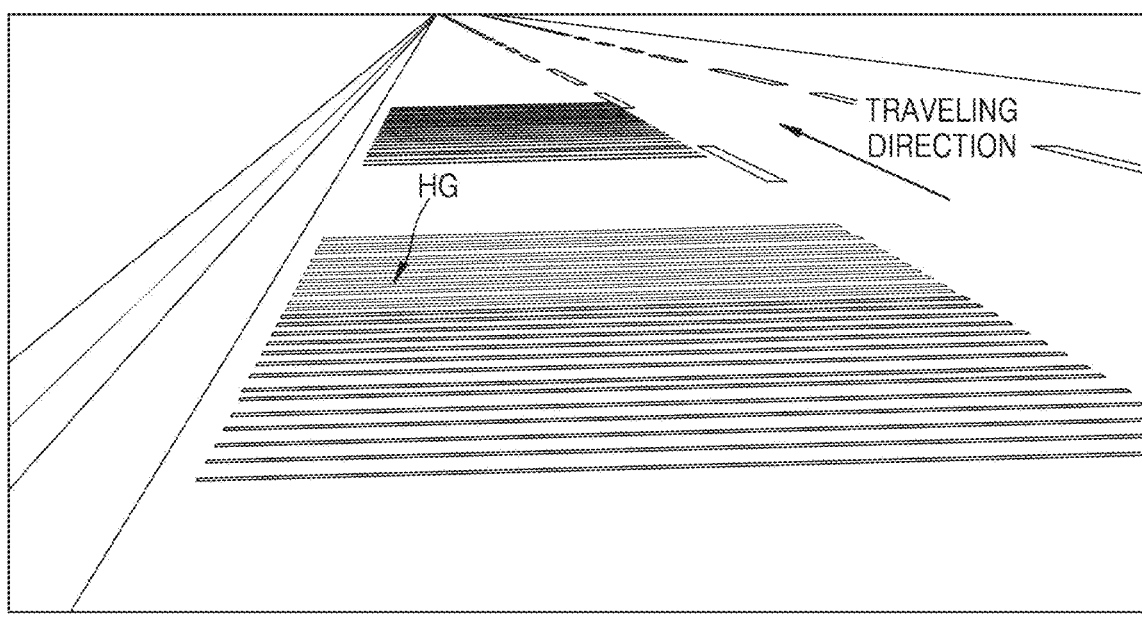
FIG. 1 is a view showing a horizontally grooved road.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

When a certain embodiment may be implemented differently, a specific process order may be performed differently from the described order. For example, two consecutively described processes may be performed substantially at the same time or performed in an order opposite to the described order.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but may include software routines in conjunction with processors, etc.

As used herein, "time domain acoustic data" includes a data set that represents amplitude of a sound wave over time.

As used herein, "frequency domain acoustic data" includes a frequency-gain data set obtained by performing Fourier transformation on the time domain acoustic data.

As used herein, an "event" means a state in which an object, a pedestrian or the like comes in contact with a vehicle 1 and an impact force greater than a predetermined level is applied to the vehicle 1.

Sizes of components in the drawings may be exaggerated for convenience of explanation. In other words, since sizes and thicknesses of components in the drawings are arbitrarily illustrated for convenience of explanation, the following embodiments are not limited thereto.

Figure 2:
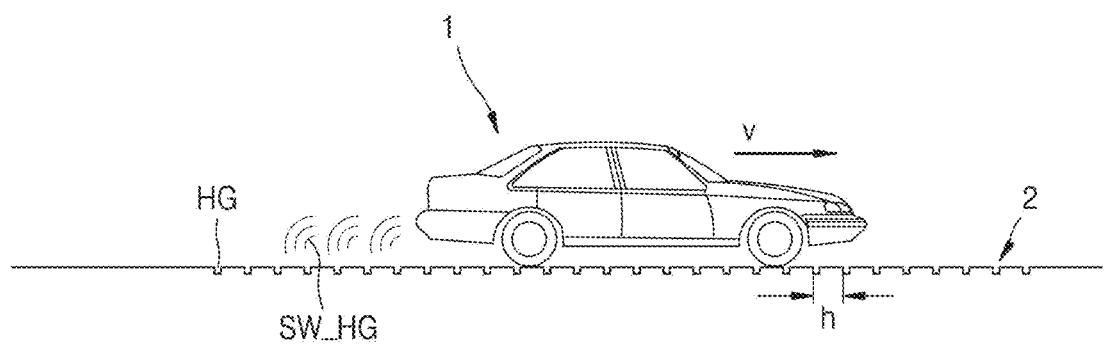
FIG. 2 is a schematic view showing a situation in which a vehicle passes over a grooved road.

FIG. 1 is a view showing a horizontally grooved road (hereinafter also referred to as the "grooved road"). FIG. 2 is a schematic view showing a situation in which a vehicle 1 passes over the grooved road 2.

Grooving means a groove of a certain size formed on a surface of road and includes longitudinal grooving horizontal to a traveling direction of a vehicle and horizontal grooving HG perpendicular to the traveling direction of the vehicle or at an angle other than 0. Among these, in particular, the horizontal grooving HG is mainly used for shortening a braking distance of the vehicle.

As shown in FIG. 2, when the vehicle 1 passes the grooved road 2, a sound SW_HG is generated between tires of the vehicle 1 and the horizontal grooving HG due to vibration, friction or the like. In particular, when the vehicle 1 passes over the horizontal groovings HG having a certain interval h at a specific speed v, a sound 'rattle' is periodically generated. In an embodiment, a speed of the vehicle 1 is estimated by analyzing the unique sound SW_HG generated when the vehicle 1 passes over the grooved road 2. The embodiment as described above may be usefully used, for example, in analyzing the speed of the vehicle 1 at the moment when an event of the vehicle 1 occurs on the grooved road 2.

Figure 3:
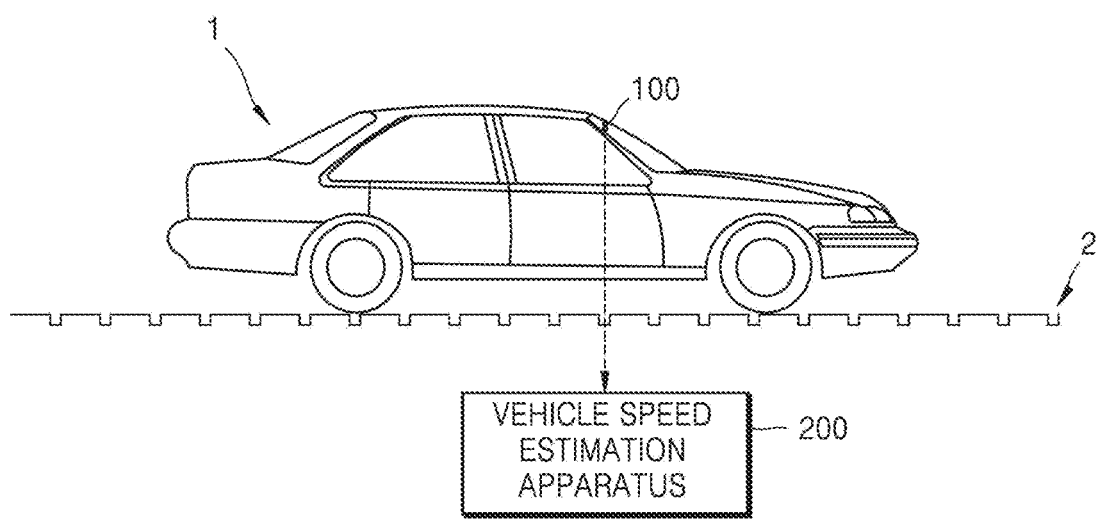
FIG. 3 is a conceptual diagram schematically showing a relationship between a vehicle speed estimation apparatus and an acoustic storage apparatus, according to an embodiment.
Figure 4:
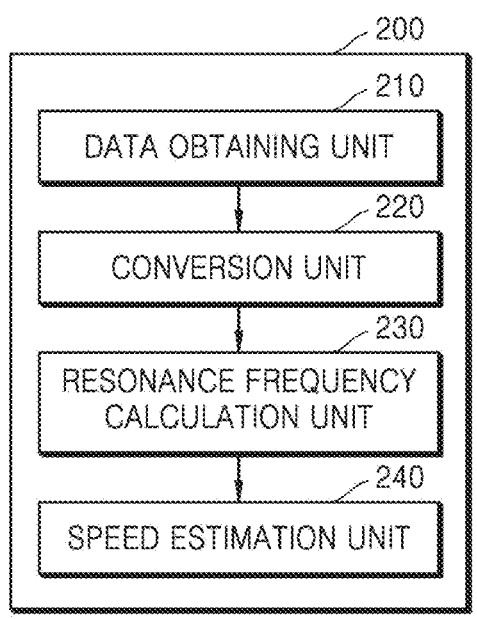
FIG. 4 is a block diagram of the vehicle speed estimation apparatus according to an embodiment.

FIG. 3 is a conceptual diagram schematically showing a relationship between a vehicle speed estimation apparatus 200 and an acoustic storage apparatus 100, according to an embodiment. FIG. 4 is a block diagram of the vehicle speed estimation apparatus 200 according to an embodiment.

The vehicle speed estimation apparatus 200 shown in FIG. 4 shows only components related to the present embodiment in order to prevent the feature of the present embodiment from being blurred. Accordingly, it will be understood by those of ordinary skill in the art that other general-purpose components other than the components shown in FIG. 4 may be further included.

The vehicle speed estimation apparatus 200 according to the present embodiment may correspond to at least one processor or may include at least one processor. Accordingly, the vehicle speed estimation apparatus 200 may be driven by being included in another hardware apparatus such as a microprocessor or a general purpose computer system.

Referring to FIG. 3, the acoustic storage apparatus 100 stores time domain acoustic data including sound information generated when the vehicle 1 passes over the grooved road 2. The acoustic storage apparatus 100 may be mounted on the vehicle 1. For example, the acoustic storage apparatus 100 may be a black box.

Alternatively, the acoustic storage apparatus 100 may be a separate device installed around the grooved road 2. Alternatively, the acoustic storage apparatus 100 may be a black box mounted on another vehicle passing around the vehicle 1 on the grooved road 2.

The vehicle speed estimation apparatus 200 obtains the time domain acoustic data when the vehicle 1 passes over the grooved road 2 from the acoustic storage apparatus 100 and analyzes the time domain acoustic data to calculate a speed of the vehicle 1.

Referring to FIG. 4, the vehicle speed estimation apparatus 200 according to an embodiment may include a data obtaining unit 210, a conversion unit 220, a resonance frequency calculation unit 230, and a speed estimation unit 240.

The data obtaining unit 210 obtains the time domain acoustic data when the vehicle 1 passes over the grooved road 2 from the acoustic storage apparatus 100. Particularly, when an event occurs on the grooved road 2, the data obtaining unit 210 may obtain time domain acoustic data at an event occurrence time and prior to the event occurrence time.

In a case where the acoustic storage apparatus 100 is a black box, the acoustic storage apparatus 100 may include not only an acoustic sensor unit that senses sound during traveling of the vehicle 1 and stores acoustic information but also an image capturing unit that captures and stores an image at a certain time interval during the traveling of the vehicle 1. At this time, the data obtaining unit 210 may obtain image data synchronized with the time domain acoustic data from the black box. The image data may include, for example, an image when the vehicle 1 passes over the grooved road 2 and an image at an event time. Accordingly, the data obtaining unit 210 may receive the time domain acoustic data synchronized with a specific image time. Here, a specific image may include an image at a section of which speed is to be estimated among images stored in the image capturing unit and may include the image at an event time of the vehicle 1.

The conversion unit 220 receives the time domain acoustic data when the vehicle 1 passes over the grooved road 2 from the data obtaining unit 210, and calculates frequency domain acoustic data using Fourier transformation. At this time, the conversion unit 220 may calculate the frequency domain acoustic data including information of a frequency domain f-domain, for example, using Fast Fourier Transformation (FFT).

According to an embodiment, the conversion unit 220 may perform short-time Fourier transformation (STFT) on the time domain acoustic data to calculate a spectrogram including time-frequency-amplitude information. The spectrogram may be expressed in the form of a three-dimensional (3D) graph or a contour graph including the time-frequency-amplitude information, which will be described later with reference to FIGS. 7 and 8 below.

The resonance frequency calculation unit 230 calculates a resonance frequency of the sound SW_HG generated between tires of the vehicle 1 and the horizontal grooving HG from the frequency domain acoustic data calculated by the conversion unit 220.

According to an embodiment, the resonance frequency calculation unit 230 may calculate a resonance frequency function with respect to time through the spectrogram. The spectrogram obtained by performing STFT shows frequency change information with respect to time. For example, when the speed of the vehicle 1 changes over time, since a cycle of the sound SW_HG generated between the tires and the horizontal grooving HG also changes, the resonance frequency is given as a function of time. At this time, the resonance frequency calculation unit 230 may calculate the resonance frequency according to time. This will be described later with reference to FIGS. 7 and 8.

The speed estimation unit 240 multiplies the resonance frequency calculated by the resonance frequency calculation unit 230 by an interval of the horizontal groovings HG to finally determine the speed of the vehicle 1 that passes over the grooved road 2. Referring back to FIG. 2, when the grooving interval is h and the resonance frequency of the sound SW_HG generated between the vehicle 1 and grooving is $f_R$, the speed of the vehicle 1 is determined as shown in Equation 1 below.

$$V = h \cdot f_R \quad \text{[Equation 1]}$$

At this time, the grooving interval h may be measured on the grooved road 2 and then input to the vehicle speed estimation apparatus 200 by a user. The speed estimation unit 240 may receive the resonance frequency $f_R$ calculated from the resonance frequency calculation unit 230 and multiplies the received resonance frequency $f_R$ by an input value of h value to finally estimate the speed of the vehicle 1 passing over the grooved road 2.

According to an embodiment, the speed estimation unit 240 may calculate a speed function with respect to time by multiplying the resonance frequency function by the interval of the horizontal groovings HG. That is, the speed estimating unit 240 may calculate the speed of the vehicle 1 according to time. This will be described later with reference to FIGS. 7 and 8.

A method of estimating the speed of the vehicle 1 passing over the grooved road 2 using the vehicle speed estimation apparatus 200 will be described with reference to FIGS. 5 and 6.

Figure 5:
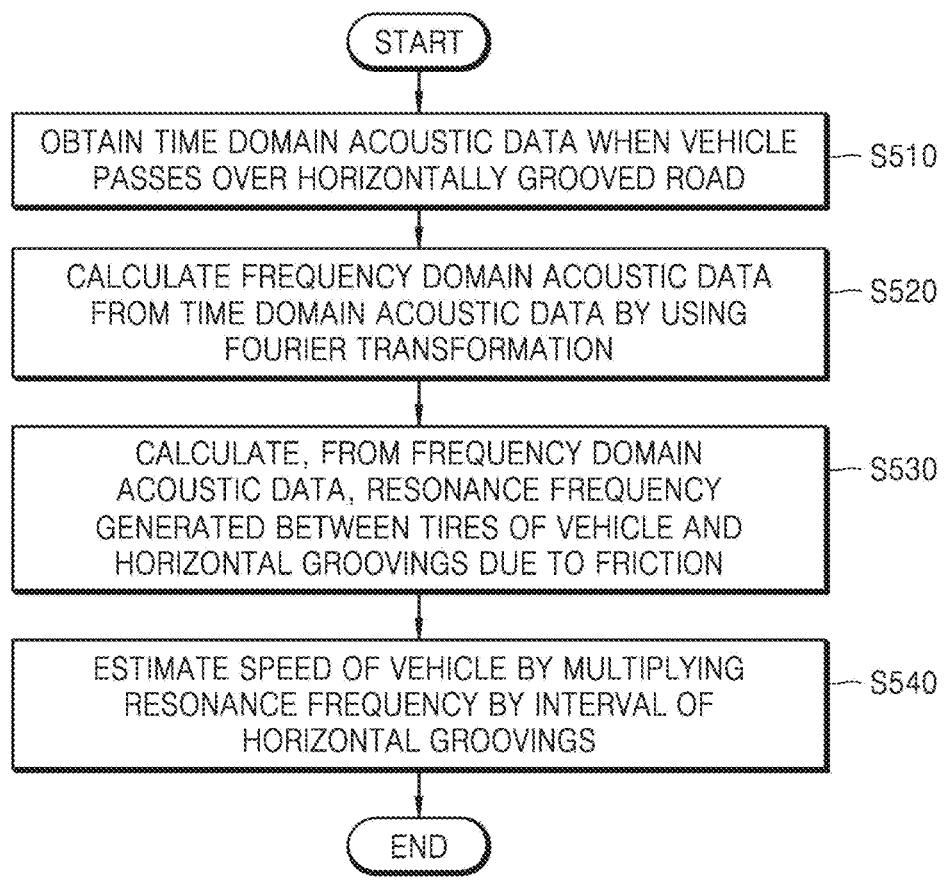
FIG. 5 is a flowchart illustrating a method of estimating a speed of a vehicle, according to an embodiment.

FIG. 5 is a flowchart illustrating a method of estimating a speed of the vehicle 1, according to an embodiment. FIG. 6 conceptually illustrates the method of estimating the speed of the vehicle 1 of FIG. 5.

Referring to FIGS. 5 and (a) of 6, an operation S510 of obtaining time domain acoustic data when the vehicle 1 passes the grooved road 2 is firstly performed from the acoustic storage apparatus 100. The vehicle speed estimation apparatus 200 receives the time domain acoustic data from the acoustic storage apparatus 100.

A user of the vehicle speed estimation apparatus 200 may determine an event voice adjacent to or before and after an event occurrence time in the time domain acoustic data obtained from the acoustic storage apparatus 100 and extract time domain acoustic data corresponding to the event voice to use the time domain acoustic data for the method of estimating the speed of the vehicle 1.

On the other hand, in a case where the acoustic storage apparatus is a black box, the data obtaining unit 210 may obtain image data synchronized with the time domain acoustic data from the black box. At this time, the user of the vehicle speed estimation apparatus 200 may determine an event image adjacent to or before and after the event occurrence time from the image data of the black box and extract time domain acoustic data corresponding to the event image to use the time domain acoustic data for the method of estimating the speed of the vehicle 1. Since the time domain acoustic data is continuously stored unlike image information captured and stored at a predetermined time interval, an instantaneous speed of the vehicle 1 may be estimated using the time domain acoustic data.

When the vehicle 1 passes over the grooved road 2, a sound 'rattle' (hereinafter also referred to as tire-grooving sound SW_HG is generated between tires and the horizontal grooving HG due to vibration, friction or the like. In particular, in a case where the speed v of the vehicle 1 and the grooving interval h are constant, the tire-grooving sound SW_HG occurs periodically. Therefore, as shown in a time-amplitude graph of (b) of FIG. 6, time domain acoustic data SD_T when the vehicle 1 passes over the grooved road 2 includes information of the tire-grooving sound SW_HG that vibrates at a certain time T. Although the time domain acoustic data SD_T generated when the vehicle 1 passes over the grooved road 2 has various sound information such as an engine sound in addition to the tire-grooving sound SW_HG, for the sake of simplicity, in (b) of FIG. 6, the time domain acoustic data SD_T is expressed in an extremely simplified manner as having only information of the tire-grooving sound SW_HG.

Thereafter, an operation S520 of calculating frequency domain acoustic data SD_F from the time domain acoustic data SD_T by using Fourier transformation is performed. In the operation S520, FFT may be used.

Figure 6A:
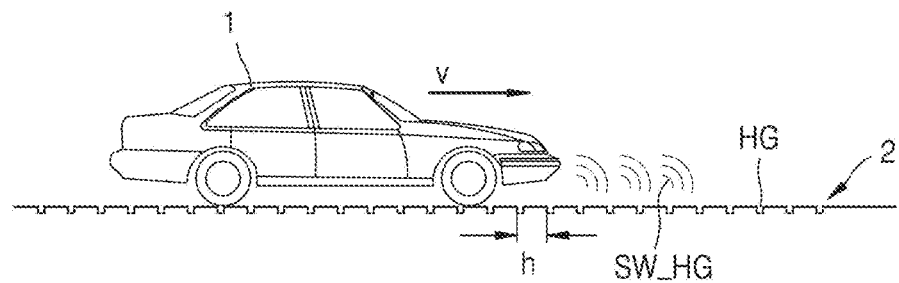
FIGS. 6A-6C conceptually illustrate the method of estimating the speed of the vehicle of FIG. 5.
Figure 6B:
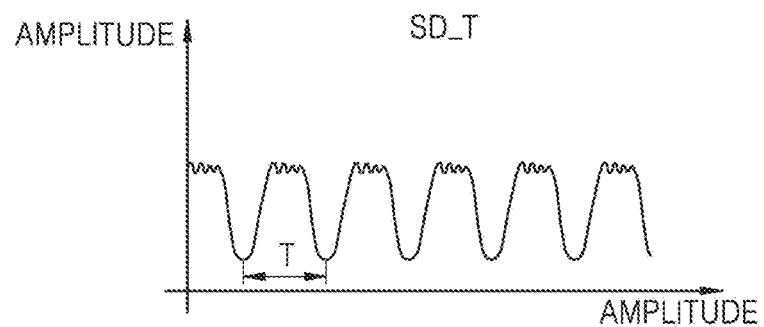
Figure 6C:
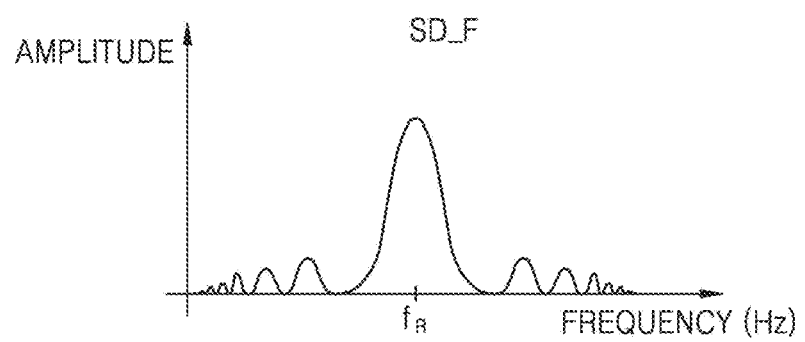

Since the time domain acoustic data SD_T includes the information of the tire-grooving sound SW_HG that periodically vibrates, when Fourier transformation is performed on the time domain acoustic data SD_T, a strong peak appears at a specific point like a graph of frequency domain acoustic data SD_F in (c) of FIG. 6.

Thereafter, an operation S530 of calculating the resonance frequency $f_R$ of sound generated between the tires of the vehicle 1 and the horizontal grooving HG, that is, the tire-grooving sound SW_HG, from the frequency domain acoustic data SD_F is performed.

As described above, the strong peak appears at the specific point in the graph of the frequency domain acoustic data SD_F due to the tire-grooving sound SW_HG that periodically vibrates. Therefore, in the operation S530, a frequency having a maximum amplitude or gain among several peaks of the frequency domain acoustic data SD_F may be calculated, which is the resonance frequency $f_R$ of the tire-grooving sound SW_HG.

Meanwhile, unlike expressed in a simplified manner in FIG. 6, the frequency domain acoustic data SD_F may have peaks in other frequency bands such as a peak due to an engine sound in addition to the peak due to the tire-grooving sound SW_HG. However, the peak due to the engine sound is observed throughout the entire traveling time of the vehicle 1, and when a gear changes during traveling, a line in which the peak rises or falls rapidly is clearly identified. Also, since an engine runs at around 2000 RPM under normal circumstances, it is common that peaks occur in a band equal to or less than about 150 Hz.

On the other hand, since the horizontal grooving HG is intermittently formed on a road, a peak appears only in a specific time period. Also, the peak due to the tire-grooving sound SW_HG shows a flat characteristic without rapidly rising or falling over time. An interval of the horizontal groovings HG is set to be about 5 cm to 15 cm and the speed of the vehicle 1 on the grooved road 2 is limited, and thus the resonance frequency $f_R$ of the tire-grooving sound SW_HG is generally limited to a frequency band equal to or less than about 100 Hz to 400 Hz. Therefore, the resonance frequency calculation unit 230 may calculate a frequency of a peak having the largest amplitude or gain, for example, equal to or less than 100 Hz to 400 Hz as the resonance frequency $f_R$ by the tire-grooving sound SW_HG.

Thereafter, an operation S540 of estimating the speed v when the vehicle 1 passes over the grooved road 2 by multiplying the interval h of the horizontal groovings HG by the resonance frequency $f_R$. In a case where the interval of the horizontal groovings HG is h and the resonance frequency of the sound generated between the vehicle 1 and the horizontal grooving HG is $f_R$, the speed v of the vehicle 1 may be obtained by multiplying the grooving interval h and the resonance frequency $f_R$ as described in Equation 1 above. Therefore, after the interval h of groovings is measured on the grooved road 2, the speed v of the vehicle 1 passing over the grooved road 2 may be finally estimated by multiplying the measured interval h by the calculated resonance frequency $f_R$.

In FIG. 6, the case where the vehicle 1 travels on the grooved road 2 at a constant speed and the interval h of groovings is constant is described. Hereinafter, a method of estimating the speed of the vehicle 1 over time when the speed of the vehicle 1 or the interval h of groovings is changed will be described with reference to FIG. 7.

Figure 7A:
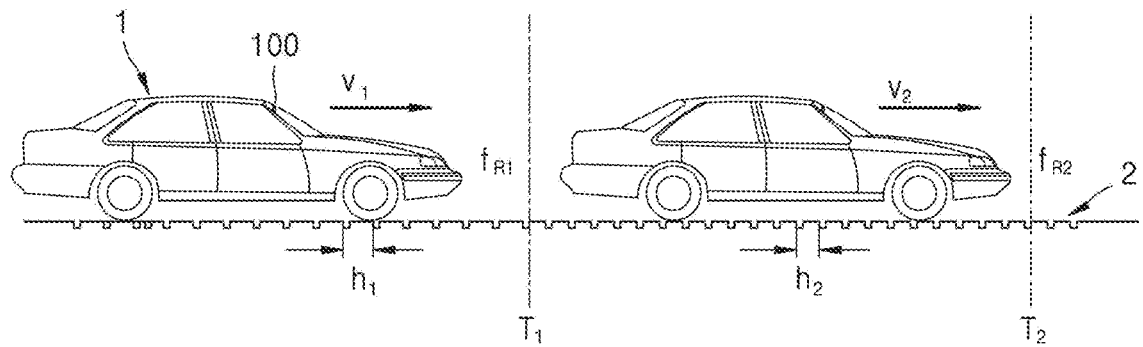
FIGS. 7A-7C conceptually illustrate a method of estimating a speed of a vehicle over time.
Figure 7B:
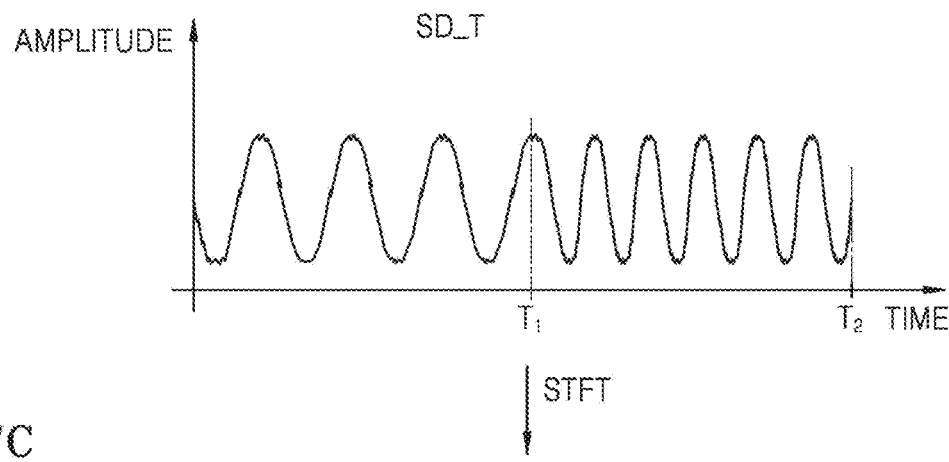
Figure 7C:
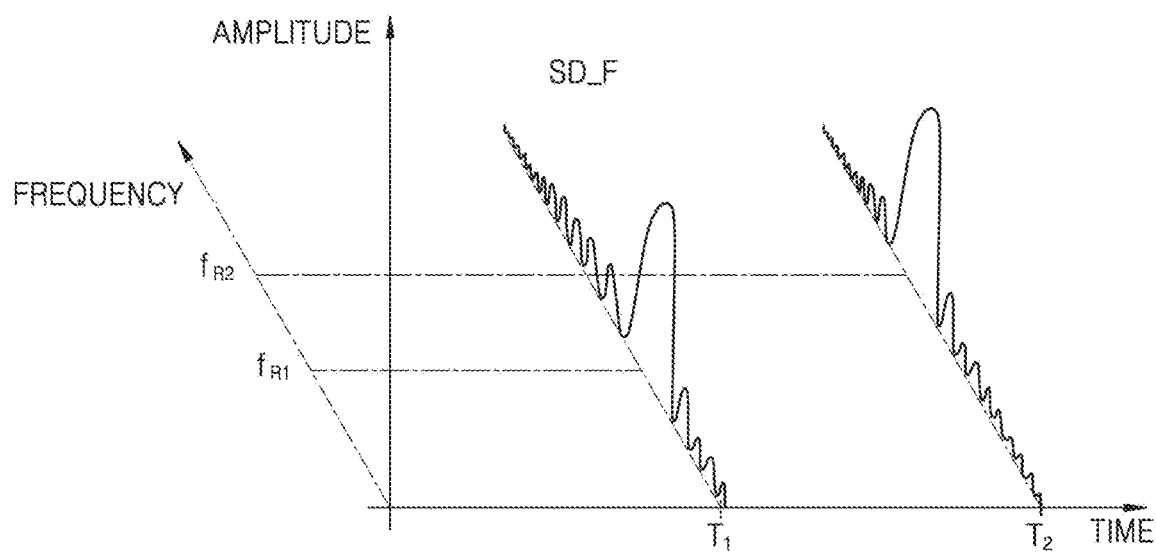

FIG. 7 conceptually illustrates a method of estimating a speed of the vehicle 1 over time. In (a) of FIG. 7, the vehicle 1 passes over the groove road 2 at a first speed v1 until a first time $T_1$ and passes over the grooved road 2 at a second speed v2 faster than the first speed v1 before a second time $T_2$.

At this time, the time domain acoustic data SD_T stored in the acoustic storage apparatus 100 includes tire-grooving sound information. At this time, as shown in a graph of (b) of FIG. 7, since the speed of the vehicle 1 is slow until the first time $T_1$, a vibration period of tire-grooving sound is comparatively long. Meanwhile, since the speed of the vehicle 1 is fast between the first time $T_1$ and the second time $T_2$, the vibration period of the tire-grooving sound is relatively short. Likewise, in (b) of FIG. 7, a waveform of the tire-grooving sound is similarly expressed in an extremely simplified manner.

In a frequency-amplitude graph obtained by performing Fourier transformation on the time domain acoustic data SD_T through a normal method, a large peak is formed in each of a low-frequency band and a high-frequency band. However, it is impossible to determine important information that the speed of the vehicle 1 has changed with respect to the first time $T_1$ only by the frequency-amplitude graph. Therefore, in order to estimate the speed of the vehicle 1 over time, it is preferable to use the frequency domain acoustic data SD_F that simultaneously indicates frequency information and time information.

According to an embodiment, an operation of obtaining the frequency domain acoustic data SD_F includes an operation of performing a STFT on the time domain acoustic data SD_T to calculate a spectrogram including time-frequency-amplitude information. STFT is a method of performing Fourier transformation on a signal in a time domain over time through a window having a predetermined interval. The spectrogram may be obtained by summing Fourier transformed spectra for each time. The spectrogram includes the time-frequency-amplitude information and may be expressed in the form of a three-dimensional (3D) graph or a contour graph.

Referring to (c) of FIG. 7, the time-frequency-amplitude information obtained by performing the STFT on the time-amplitude graph of (b) is expressed in the form of the 3D graph. Likewise, in (c) of FIG. 7, a waveform in a frequency domain of the tire-grooving sound is similarly extremely simplified. At this time, a frequency-amplitude graph having a peak in the low frequency band is formed at the first time $T_1$, and a frequency-amplitude graph having a peak at the high frequency band is formed at the second time $T_2$. At this time, frequencies $f_{R1}$ and $f_{R2}$ at which the respective frequency-amplitude graphs have a maximum peak become resonance frequencies due to the tire-grooving sound before and after the speed of the vehicle 1 changes. That is, through the spectrogram of (c), it may be calculated that the resonance frequency before the first time $T_1$ is $f_{R1}$ and the resonance frequency before the second time $T_2$ is $f_{R2}$.

Although the speed of the vehicle 1 is changed discretely in FIG. 7 for convenience of description, in a case where an interval between the first time $T_1$ and the second time $T_2$ is sufficiently short, a change of the resonance frequency $f_R$ may be substantially continuously identified. That is, according to an embodiment, the operation S530 of calculating the resonance frequency $f_R$ is an operation of calculating a resonance frequency function with respect to time through the spectrogram. On the other hand, since a width of grooving is not considered in a process of obtaining the resonance frequency function, the above-described principle may be applied even if the speed of the vehicle 1 and the width of the grooving are both varied.

According to an embodiment, the operation S540 of estimating the speed v includes an operation of multiplying the resonance frequency function by the interval of the horizontal groovings HG to calculate a speed function over time. At this time, in a case where the interval of the horizontal groovings HG changes depending on a position of a road, the speed of the vehicle 1 may be estimated by multiplying a resonance frequency at a specific time by the interval of groovings of a position of the vehicle 1 at a specific time. For example, in (a) of FIG. 7, a speed $v_1$ of the vehicle 1 before the first time $T_1$ may be obtained by multiplying the resonance frequency $f_{R1}$ before the first time $T_1$ by a first width $h_1$ of the grooving. Similarly, a speed $v_2$ of the vehicle 1 before the second time $T_2$ may be obtained by multiplying the resonance frequency $f_{R2}$ before the second time $T_2$ by a second width $h_2$ of the grooving. In this way, it is possible to calculate the speed function over time in the entire section of the grooved road 2.

Figure 8:
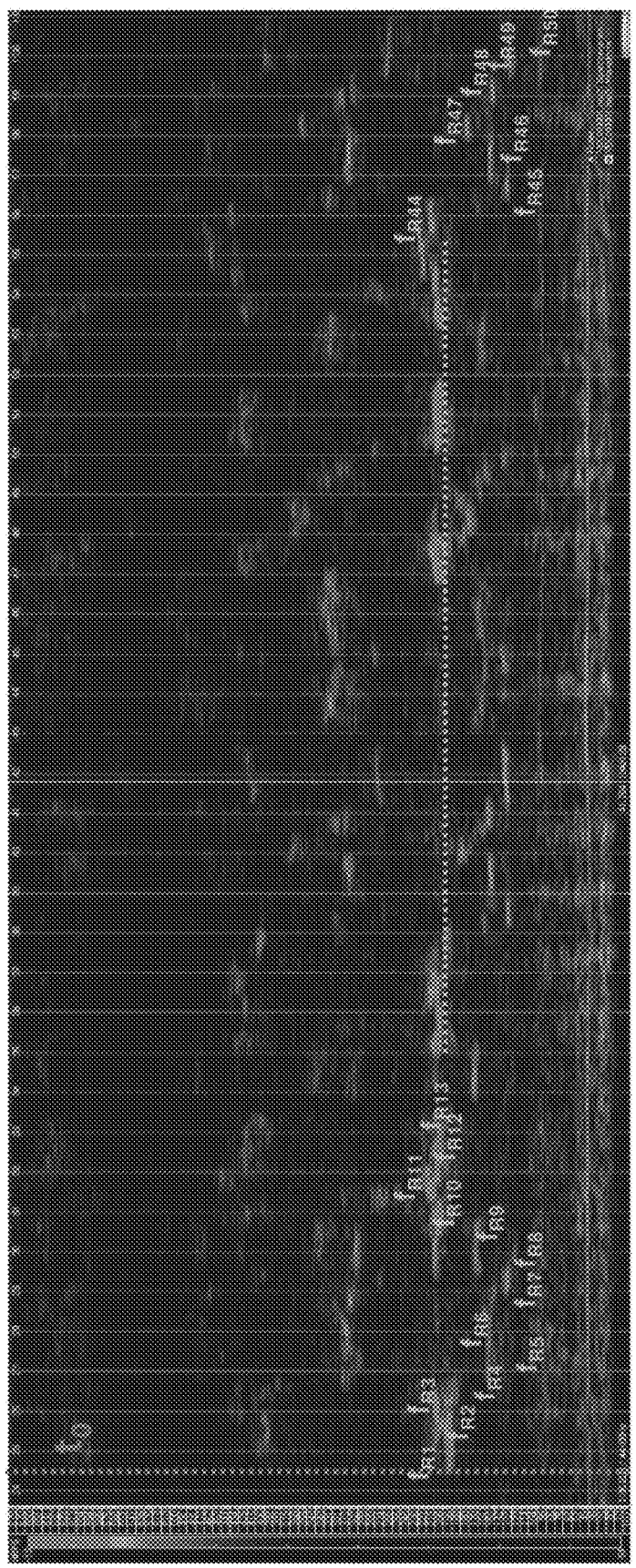
FIG. 8 is a graph showing a spectrogram when a vehicle passes over a road where a grooving interval changes in an experiment example.
Figure 9:
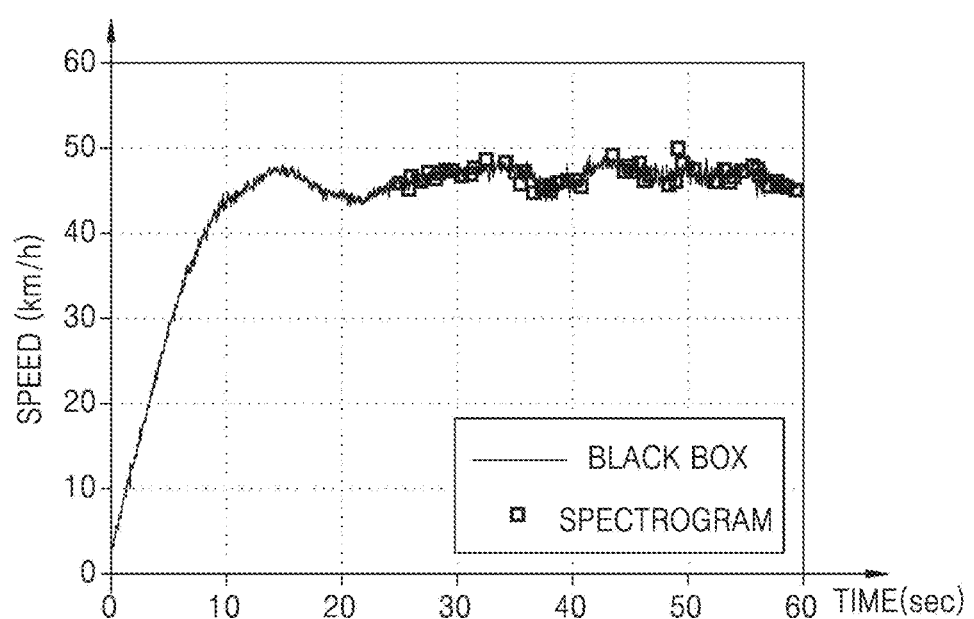
FIG. 9 is a graph comparing a speed of a vehicle calculated from the spectrogram of FIG. 8 and a speed of the vehicle obtained from a black box.

FIG. 8 is a graph showing a spectrogram when a vehicle passes over a road where a grooving interval changes in an experiment example. FIG. 9 is a graph of comparing a speed of the vehicle 1 calculated from the spectrogram of FIG. 8 and a speed of the vehicle 1 obtained from a black box.

In one experiment example of the embodiment, time domain acoustic data is obtained using the black box on a 'singing road' of Jeongseon-gun of Gangwon-do where the horizontal grooving HG is formed, and then analyzed to estimate the speed of the vehicle 1. The 'singing road' is a road where the grooving interval changes 50 times as shown in [Table 1] below, and music sound is made when the vehicle 1 moves by adjusting a tone of sound generated between tires of the vehicle 1 traveling at a constant speed and the horizontal grooving HG.

TABLE 1

| No. | Grooving interval | Resonance frequency |
| --- | --- | --- |
| 1 | 6.3 cm | $f_{R1}$ |
| 2 | 5.7 cm | $f_{R2}$ |
| 3 | 6.4 cm | $f_{R3}$ |
| 4 | 8.0 cm | $f_{R4}$ |
| 5 | 8.7 cm | $f_{R5}$ |
| 6 | 8.05 cm | $f_{R6}$ |
| 7 | 8.4 cm | $f_{R7}$ |
| 8 | 9.45 cm | $f_{R8}$ |
| 9 | 7.6 cm | $f_{R9}$ |
| 10 | 6.05 cm | $f_{R10}$ |
| 11 | 4.65 cm | $f_{R11}$ |
| 12 | 6.05 cm | $f_{R12}$ |
| 13 | 6.45 cm | $f_{R13}$ |
| 14 | 7.7 cm | $f_{R14}$ |

TABLE 1-continued

| No. | Grooving interval | Resonance frequency |
| --- | --- | --- |
| 15 | 6.1 cm | $f_{R15}$ |
| 16 | 4.7 cm | $f_{R16}$ |
| 17 | 6.1 cm | $f_{R17}$ |
| 18 | 5.7 cm | $f_{R18}$ |
| 19 | 6.1 cm | $f_{R19}$ |
| 20 | 7.75 cm | $f_{R20}$ |
| 21 | 9.25 cm | $f_{R21}$ |
| 22 | 8.3 cm | $f_{R22}$ |
| 23 | 6.8 cm | $f_{R23}$ |
| 24 | 7.85 cm | $f_{R24}$ |
| 25 | 8.05 cm | $f_{R25}$ |
| 26 | 9.35 cm | $f_{R26}$ |
| 27 | 8.2 cm | $f_{R27}$ |
| 28 | 9.2 cm | $f_{R28}$ |
| 29 | 8.1 cm | $f_{R29}$ |
| 30 | 7.85 cm | $f_{R30}$ |
| 31 | 7.75 cm | $f_{R31}$ |
| 32 | 6.05 cm | $f_{R32}$ |
| 33 | 6.7 cm | $f_{R33}$ |
| 34 | 7.6 cm | $f_{R34}$ |
| 35 | 8.7 cm | $f_{R35}$ |
| 36 | 9.4 cm | $f_{R36}$ |
| 37 | 6.1 cm | $f_{R37}$ |
| 38 | 8.05 cm | $f_{R38}$ |
| 39 | 6.1 cm | $f_{R39}$ |
| 40 | 4.6 cm | $f_{R40}$ |
| 41 | 5.9 cm | $f_{R41}$ |
| 42 | 5.65 cm | $f_{R42}$ |
| 43 | 6.0 cm | $f_{R43}$ |
| 44 | 7.9 cm | $f_{R44}$ |
| 45 | 9.4 cm | $f_{R45}$ |
| 46 | 8.05 cm | $f_{R46}$ |
| 47 | 7.0 cm | $f_{R47}$ |
| 48 | 7.85 cm | $f_{R48}$ |
| 49 | 8.2 cm | $f_{R49}$ |
| 50 | 9.35 cm | $f_{R50}$ |

Since the grooving interval changes 50 times as shown in Table 1 above, resonance frequencies $f_{R1}$ to $f_{R50}$ when the vehicle 1 passes over each grooving also change 50 times.

Referring to FIG. 8, the spectrogram representing time-frequency-amplitude information is shown in the form of a contour graph. At this time, an amplitude or gain of a frequency is indicated in a color. In this case, it may be seen that a red region corresponding to a 'peak' is not seen at a frequency below 250 Hz before a specific time $t_0$ (about 24.5 seconds), but the red region is seen after the specific time $t_0$. That is, it may be estimated that the vehicle 1 has entered the 'singing road' in which the horizontal groove is formed at the specific time $t_0$. On the other hand, it may be estimated that the grooving interval changes at a time when a position of a peak, that is, the red region, changes. Accordingly, it may be seen that the resonance frequencies $f_{R1}$ to $f_{R50}$ change 50 times in total in FIG. 8 ($f_{R14}$ to $f_{R44}$ are omitted in FIG. 8). Since the resonance frequencies $f_{R1}$ to $f_{R50}$ are calculated for each grooving interval shown in [Table 1], the speed of the vehicle 1 that passes over each grooving may be estimated by multiplying the grooving interval by the resonance frequencies $f_{R1}$ to $f_{R50}$.

Referring to FIG. 9, a speed graph of the vehicle 1 estimated from the spectrogram from 24.5 seconds after the vehicle 1 enters the 'singing road' is illustrated. It may be seen that the speed of the vehicle 1 estimated from the spectrogram and the speed of the vehicle 1 obtained from the black box are well identical.

As described above, according to the apparatus and method for estimating a speed of a vehicle according to an embodiment, the speed of the vehicle may be estimated by analyzing a unique sound generated when the vehicle passes over a grooved road. The embodiments as described above may be utilized in analyzing the speed of the vehicle at the moment when a vehicle event occurs on, for example, the grooved road. The embodiments may also be particularly useful when the speed of the vehicle may not be estimated using other methods or a result of estimating the speed of the vehicle is confirmed using other methods.

Meanwhile, the method for estimating a speed of a vehicle according to an embodiment may be implemented as a program that may be executed in a computer and may be implemented in a general-purpose digital computer that operates the program using a computer-readable recording medium. The computer-readable recording medium includes a storage medium such as a magnetic storage medium (e.g., ROM, floppy disk, hard disk, etc.) and an optical reading medium (e.g., CD ROM, DVD, etc.).

As described above, according to the apparatus and method for estimating a speed of a vehicle according to an embodiment, the speed of the vehicle may be estimated by analyzing a unique sound generated when the vehicle passes over a grooved road. The embodiments as described above may be utilized in analyzing the speed of the vehicle at the moment when a vehicle event occurs on, for example, the grooved road. The embodiments may also be particularly useful when the speed of the vehicle may not be estimated using other methods or a result of estimating the speed of the vehicle is confirmed using other methods.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of estimating a speed of a vehicle, the method comprising:
    obtaining time domain acoustic data from an acoustic storage apparatus when the vehicle passes over a horizontally grooved road;
    calculating frequency domain acoustic data from the time domain acoustic data by using Fourier transformation;
    calculating, from the frequency domain acoustic data, a resonance frequency of sound generated between tires of the vehicle and horizontal groovings in the road; and
    estimating the speed when the vehicle passes over the horizontally grooved road by multiplying the resonance frequency by an interval of the horizontal groovings.

2. The method of claim 1, wherein the obtaining of the time domain acoustic data comprises: calculating a spectrogram comprising time-frequency-amplitude information by performing short-time Fourier transformation (STFT) on the time domain acoustic data.

3. The method of claim 2,
    wherein the calculating of the frequency domain acoustic data comprises: calculating a resonance frequency function with respect to time through the spectrogram, and
    wherein the estimating of the speed comprises: calculating a speed function with respect to time by multiplying the resonance frequency function by the interval of the horizontal groovings.

4. An apparatus for estimating a speed of a vehicle, the apparatus comprising:
    a data obtaining unit configured to obtain time domain acoustic data from an acoustic storage apparatus when the vehicle passes over a horizontally grooved road;
    a conversion unit configured to calculate frequency domain acoustic data from the time domain acoustic data by using Fourier transformation;
    a resonance frequency calculation unit configured to calculate, from the frequency domain acoustic data, a resonance frequency of sound generated between tires of the vehicle and horizontal groovings in the road; and
    a speed estimation unit configured to estimate the speed when the vehicle passes over the horizontally grooved road by multiplying the resonance frequency by an interval of the horizontal groovings.

5. The apparatus of claim 4, wherein the conversion unit is configured to calculate a spectrogram comprising time-frequency-amplitude information by performing short-time Fourier transformation (STFT) on the time domain acoustic data.

6. The apparatus of claim 5,
    wherein the resonance frequency calculation unit is further configured to calculate a resonance frequency function with respect to time through the spectrogram, and
    wherein the speed estimation unit is further configured to calculate a speed function with respect to time by multiplying the resonance frequency function by the interval of the horizontal groovings.

7. A non-transitory computer-readable recording medium having recorded thereon a program for performing the method of any one of claims 1 to 3 in a computer.

* * * * *